Aug. 15, 1967  J. I. RUSSO  3,335,485
METHOD FOR MAKING ELBOWS
Filed Aug. 4, 1964  3 Sheets-Sheet 1

INVENTOR.
JOHN I. RUSSO
BY
Max Schwartz
ATTORNEY

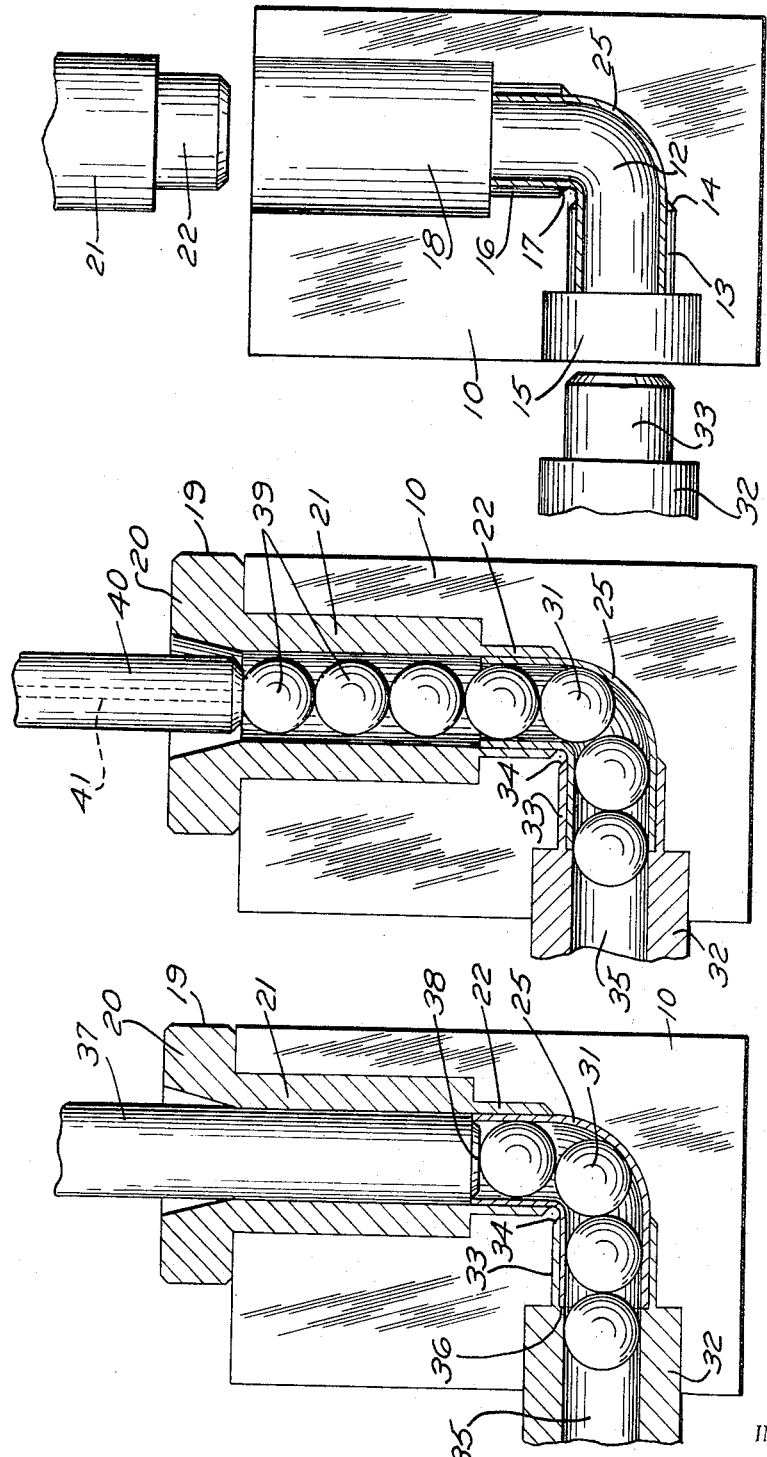

Aug. 15, 1967  J. I. RUSSO  3,335,485
METHOD FOR MAKING ELBOWS
Filed Aug. 4, 1964  3 Sheets-Sheet 3

INVENTOR.
JOHN I. RUSSO
BY
Max Schwartz
ATTORNEY

United States Patent Office 3,335,485
Patented Aug. 15, 1967

3,335,485
METHOD FOR MAKING ELBOWS
John I. Russo, Cranston, R.I., assignor of one-half to
Frank A. Ronci, Providence, R.I.
Filed Aug. 4, 1964, Ser. No. 387,360
5 Claims. (Cl. 29—157)

My present invention relates to the metal working art and more particularly to a novel method and means of making tubular elbows and elbow fittings having a short radius.

The principal object of the present invention is to provide a novel method and means for producing short radius elbows in a novel die.

A further object of the present invention is to provide a novel method and means of producing short radius elbows wtih a minimum of handling.

A further object of the present invention is to provide a novel method of producing short radius elbows and elbow fittings utilizing a novel die construction which permits an automatic series of operations to complete the fitting in a single die with a minimum of handling.

Another object of the present invention is to provide a novel method and means for making elbows and elbow fittings easily and rapidly and with a minimum of cost.

A further object of the present invention is to provide a novel method and means for making elbow and elbow fittings in a simple die and tool construction which is easy and economical to manufacture and assemble.

With the above and other objects and advantageous features in view, my invention consists of a novel arrangement of parts and a novel method of manufacture, more fully disclosed in the detailed description following, in conjunction with the accompanying drawings, and more particularly defined in the appended claims.

In the drawings,

FIGS. 1 to 8 inclusive are sections of a book type die taken generally along line 1—1 on FIG. 9 and illustrating the various steps in the manufacture of an elbow fitting.

It has been customary to make elbows of small radii in relation to diameter by forcing a seamless tube through a preformed die. The tube or die blank was usually internally supported to maintain its diameter during the forming operation. Such internal supports have been provided in more or less plastic or liquid materials such as lead, sand, resin, tar or water. In some instances mandrels have been provided for either supporting the wall or for a later ironing operation. It is also customary to finish the ends of the bent blank, as by cutting, after they are removed from the die. It is then necessary to place them in another die for expanding the ends to size to produce the completed elbow.

The present invention is designed to accomplish two important advances over the art by means of the novel apparatus and novel method herein described. First, the applicant provides a support for the tube or blank while it is being bent in the form of sizing balls. While sizing balls have been used before, it is believed that the method of utilizing the sizing balls for the purposes described is novel in the art. Secondly, the applicant has provided a die construction and method of operation which permits the completed manufacture of the finished elbow within the basic die. This reduces a great deal of handling, provides for automatic operation, and greatly increases production at a minimum of cost.

Figure 1:
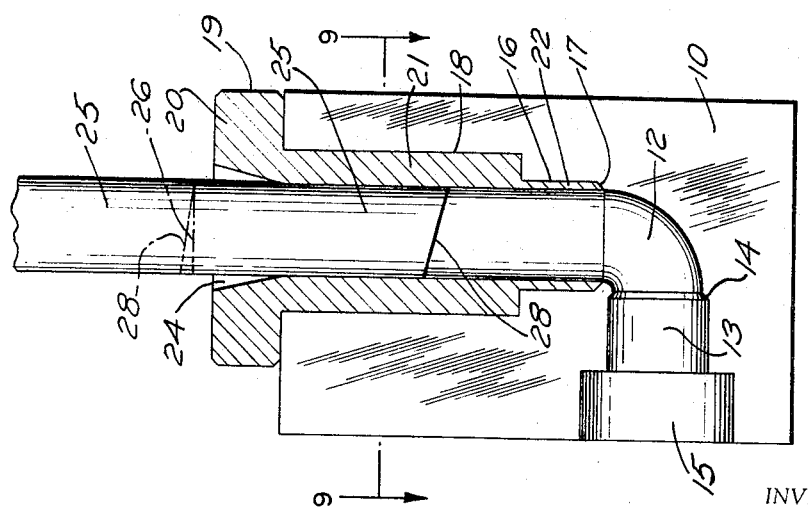
Figure 9:
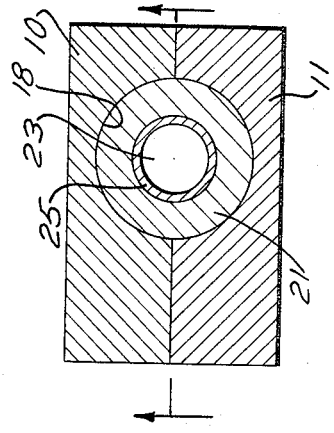
FIG. 9 is a section taken along line 9—9 on FIG. 1 of the entire die.

It is customary to form the bend of the elbow by forcing a tubular blank through a right angled channel of a forming die. However, in accordance with the method of the present invention, the die of the present invention comprises more than just a straight forming channel. Referring to FIGS. 1 and 9, the die is split in two identical halves, a lower die element 10 and an upper die element 11. For the purposes of illustration the upper die element 11 is not shown in FIGS. 1 to 8 inclusive. The 90° bend is positioned towards the bottom third of the die as shown in FIG. 1 at 12. Extending to the left in FIG. 1 from the end of the 90° bend portion 12 is an enlarged straight section 13 which is joined to the section 12 by the short tapered portion 14. The portion 13 finally joins an enlarged portion 15 which extends to the left edge of the die as shown in FIG. 1. The vertical leg of the die opening also comprises a short section 16 extending from the other side of the bend 12 and identical to the section 13. This is also joined to the bend portion 12 by a short taper 17. The section 16 opens into a wide portion 18 which extends vertically to the upper end of the die as shown in FIG. 1. The portion 18 is of the same diameter as the portion 15 but of course much longer.

Figure 3:
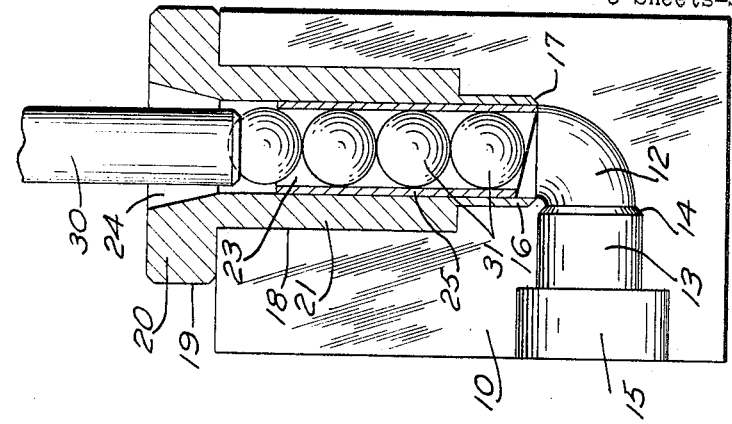
Figure 2:
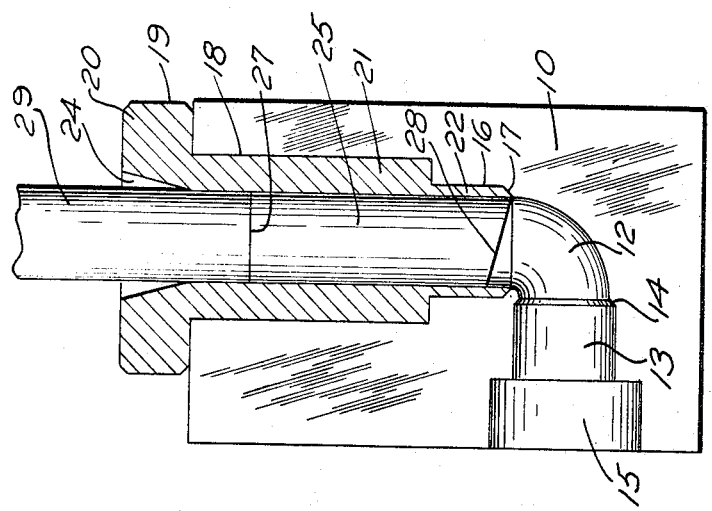

Now referring to FIGS. 1 to 3 inclusive, I provide a liner 19 having an enlarged outer head 20 and a cylindrical body portion 21 adapted to fit into the enlarged portion 18 of the die. At its lower end the cylindrical portion 21 is reduced to a thin portion 22 having a tapered bottom edge which fits into the narrow portion 15 of the die with the tapered bottom edge nesting against the tapered portion 17. The liner 19 has an internal diameter equal to the diameter of the 90° bend 12 to form a cylindrical die passageway of uniform length with the elbow 12. At its outer edge in the enlarged head 20, the internal die passageway 23 has a tapered enlargement 24 for leading into the die. The initial steps of applicant's novel method are accomplished in the liner 19. As shown in FIG. 1, a suitable tubing 25 is inserted into the liner and cut with a double saw at 26 to form a straight back edge 27 as shown in FIG. 2, and an angle of 10° or 15° at 28. When the tube 25 is forced through the bend 12 of the die the material at the outer portion of the bend is frictionally forced rearwardly so that the finished piece will have a square edge if it is initially cut as illustrated. After the cutting operation shown in FIG. 1, a plunger 29 with a diameter equal to the inside diameter of the liner 19 is moved inwardly to engage the back end 27 of the piece of tubing 25 and move it inwardly until its bottom tapered edge 28 reaches the bend 12 of the die. At this point the plunger 29 is withdrawn and a second plunger 30 is inserted therein as shown in FIG. 3. Before the plunger 30 is inserted, a plurality of sizing balls 31 are first put into the liner and the plunger 30 pushes the balls downwardly until they reach the position shown in FIG. 3. These sizing balls are of accurate diameter corresponding to the required internal diameter of the finished elbow. They are designed to frictionally engage the inside walls of the tubing 25 and to prevent collapse of the walls and the maintenance of the proper size during the bending operation. It should be noted that the plunger 30 is of smaller diameter than the internal diameter 23 of the liner 19.

Now referring to FIGS. 4 and 5, I provide a second liner 32 having an outside diameter equal to the enlarged portion 15 but terminating in a thin walled reduced portion 33 which fits into the reduced portion 13 and has a tapered end 34 which nests against the tapered portion 14 of the die. The internal diameter of the liner 32 at the enlarged portion 35 is equal to the internal diameter of the tubing 25. However, the internal diameter of the narrow portion 33 is equal to the external diameter of the tubing 35. This forms a shoulder 36 which acts as a stop and squaring element for the edge 28 of the tubing. In this step shown in FIG. 4, a plunger 37 enters the liner 19. The plunger 37 is equal to the diameter of the liner 19 at 23 and is provided with a reduced tapered end 38 which contacts the sizing balls 31. The circumferential bottom edge of the plunger 37 engages the rear edge 27 of the tubing 25 and forces it around the bend 12 of the die into the position shown in FIG. 4 with its leading edge flush against the shoulder 36 and the sizing balls 31 completely around the bend with the first ball already about to leave the tubing. The plunger 37 is now withdrawn and, as shown in FIG. 5, additional sizing balls 39 are inserted into the liner 19 followed by another plunger 40 similar to the plunger shown in FIG. 3 and of smaller diameter than the internal diameter of the liner. The plunger 40 is designed to drive downwardly until it forces the sizing balls 31 and 39 through the bent tubing as far as it is able to, and then a blast of air is forced through a central opening 41 in the plunger to completely clear the sizing balls from the tubing. The movement of the sizing balls 31 and 39 through the bent tubing serves to completely smooth the interior of the bent section to the required diameter.

Figure 7:
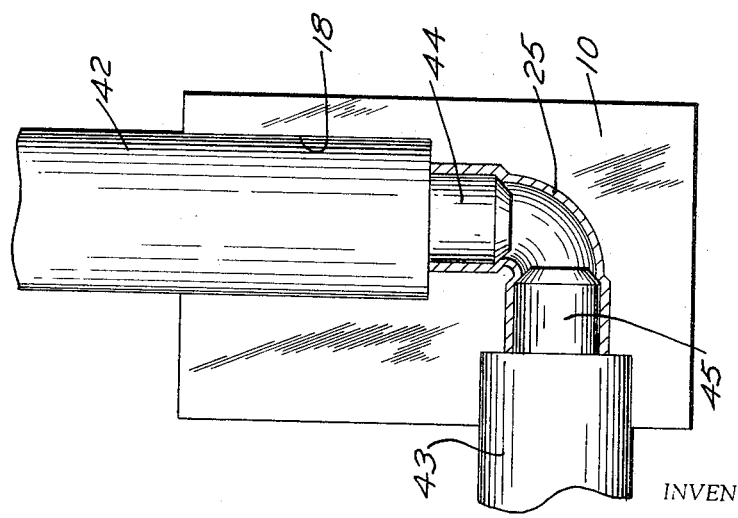

Now referring to FIG. 6, the liners 19 and 32 are withdrawn leaving the tube 25 bent at a 90° angle and internally and externally at the correct size in the die. It should be noted that adjacent the outer ends, the straight portions of the bent tube are now positioned in enlarged portions of the die 16 and 13. Now referring to FIG. 7, plungers 42 and 43 enter the die passageways 18 and 15. Each plunger is provided at its end with a reduced portion 44 and 45 terminating in tapered ends. The reduced portions 44 and 45 have an external diameter equivalent to the required internal diameter of the cupped ends of the finished elbow. Thus when the plungers are inserted as shown in FIG. 7 they will serve to expand the ends of the tubing into the wide portions of the die 16 and 13.

Figure 10:
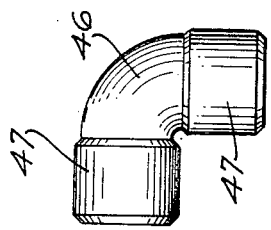
FIG. 10 is a side elevation of the finished L.
Figure 8:
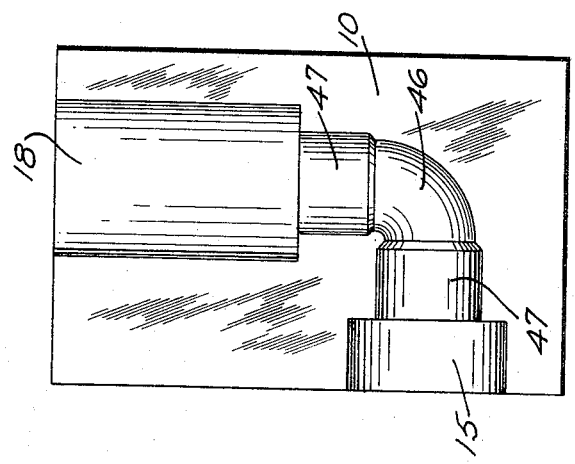

FIG. 8 illustrates the plungers 42 and 43 completely withdrawn from the die and the die in open position revealing the finished elbow 46 having cupped ends 47 as shown in FIG. 10. The size of the bent portion 46 can of course be varied in accordance with the die as can also the size and length of the cupped ends 47. If desired the elbow may be formed in the form of a so-called street elbow having only one cupped end 47. This can readily be accomplished by using only a single plunger 42 and eliminating the plunger operation 43 shown in FIG. 7.

In accordance with the present invention therefore the manufacture of the completed elbow shown in FIG. 10 from a coil of tubing 25 as illustrated in FIG. 1 is accomplished with various plungers in the single die. The steps of the process as above described are therefore directly related to the figures of the drawings as follows:

(1) The tubing is partially inserted into the liner 19 and the rear end is cut with a double cut saw at an angle of 10° or 15° as shown in FIG. 1.

(2) The tubing is now advanced further into the liner 19 until its bottom edge reaches the bend 12 in the die by means of a plunger 29 as shown in FIG. 2.

(3) A plurality of sizing balls 31 are pushed into position within the tubing blank 25 by another plunger 30 as shown in FIG. 3.

(4) Another plunger 37 now pushes the blank 25 with its sizing balls around the bend of the die and against the second liner 32 as shown in FIG. 4.

(5) Additional sizing balls are now added and another plunger 40 having a central passageway 41 is used to push the sizing balls completely through the die followed by a blast of air to completely clear the die.

(6) The liners 19 and 32 are removed from the die leaving the blank in the bend as shown in FIG. 6.

(7) Plungers 42 and 43 are now inserted to provide the cupped ends of the elbow as shown in FIG. 7.

This completes the operations, the die can then be opened and the finished piece removed. The above method of operation is made possible by the novel die, liner and plunger constructions. The operation is efficient and rapid and produces a finished elbow from the length of tubing in a single automatic sequence resulting in a considerable saving in time, labor and materials. Other advantages of the present invention will be readily apparent to a person skilled in the art.

I claim:

1. The method of forming an elbow which comprises positioning a length of a straight tube of metal in a forming die having a bore substantially equal to the outer diameter of the desired elbow, filling the tube with sizing balls having a diameter substantially equal to the internal diameter of the desired elbow, applying pressure to the exposed edge of the tube by means of a plunger until the desired bend has been effected, pushing the sizing balls through the tube by means of a narrow plunger to smooth the interior of the bent tube to the desired uniform diameter, removing a portion of the die to enlarge the bore, expanding at least one end of the bent tube into the enlarged bore to size, and removing the finished elbow from the die.

2. The method of forming an elbow which comprises cutting the forward edge of a length of a straight tube of metal to provide a slanted forward edge, positioning the slanted forward edge in a forming die having a bore substantially equal to the outer diameter of the desired elbow, cutting the length of straight tube with a double saw to provide a slanted forward edge and a straight back edge, filling the tube with sizing balls having a diameter substantially equal to the internal diameter of the desired elbow, applying pressure to the exposed edge of the tube by means of a plunger until the desired bend has been effected, pushing the sizing balls through the tube by means of a narrow plunger to smooth the interior of the bent tube to the desired uniform diameter, completing the pushing action with a blast of compressed air through the narrow plunger, removing a portion of the die to enlarge the bore, expanding at least one end of the bent tube into the enlarged bore to size, and removing the finished elbow from the die.

3. The method of forming an elbow which comprises positioning a length of a straight tube of metal in a forming die having a bore substantially equal to the outer diameter of the desired elbow, filling the tube with sizing balls having a diameter substantially equal to the internal diameter of the desired elbow, applying pressure to the exposed edge of the tube by means of a plunger until the desired bend has been effected, adding additional sizing balls to the tube, pushing the sizing balls through the tube by means of a narrow plunger to smooth the interior of the bent tube to the desired uniform diameter, completing the pushing action with a blast of compressed air through the narrow plunger, removing a portion of the die to enlarge the bore, expanding at least one end of the bent tube into the enlarged bore to size, and removing the finished elbow from the die.

4. The method of forming an elbow which comprises cutting the forward edge of a length of a straight tube of metal to provide a slanted forward edge, positioning the slanted forward edge in a forming die having a bore substantially equal to the outer diameter of the desired elbow, cutting the length of straight tube with a double saw to provide a slanted forward edge and a straight back edge, filling the tube with sizing balls having a diameter substantially equal to the internal diameter of the desired elbow, applying pressure to the exposed edge of the tube by means of a plunger until the desired bend has been effected, adding additional sizing balls to the tube, pushing the sizing balls through the tube by means of a narrow plunger to smooth the interior of the bent tube to the desired uniform diameter, completing the pushing action with a blast of compressed air through the narrow plunger, removing a portion of the die to enlarge the bore, expanding at least one end of the bent tube into the enlarged bore to size, and removing the finished elbow from the die.

5. The method of forming an elbow which comprises cutting the forward edge of a length of a straight tube of metal to provide a slanted forward edge, positioning the slanted forward edge in a forming die having a bore substantially equal to the outer diameter of the desired elbow, cutting the length of straight tube with a double saw to provide a slanted forward edge and a straight back edge, filling the tube with sizing balls having a diameter substantially equal to the internal diameter of the desired elbow, applying pressure to the exposed edge of the tube by means of a plunger until the desired bend has been effected, adding additional sizing balls to the tube, pushing the sizing balls through the tube by means of a narrow plunger to smooth the interior of the bent tube to the desired uniform diameter, removing a portion of the die to enlarge the bore, expanding at least one end of the bent tube into the enlarged bore to size, and removing the finished elbow from the die.

References Cited

UNITED STATES PATENTS

| | | | |
|---|---|---|---|
| 1,429,924 | 11/1922 | Brinkman. | |
| 1,455,771 | 5/1923 | Anderson | 72—75 X |
| 1,978,452 | 10/1934 | Flodin | 29—157 |

FOREIGN PATENTS

| | | |
|---|---|---|
| 451,838 | 8/1936 | Great Britain. |
| 748,085 | 10/1944 | Germany. |

JOHN F. CAMPBELL, *Primary Examiner.*

J. D. HOBART, *Assistant Examiner.*